A. ADAMS.
Harvester Rake.
No. 91,401. Patented June 15, 1869.
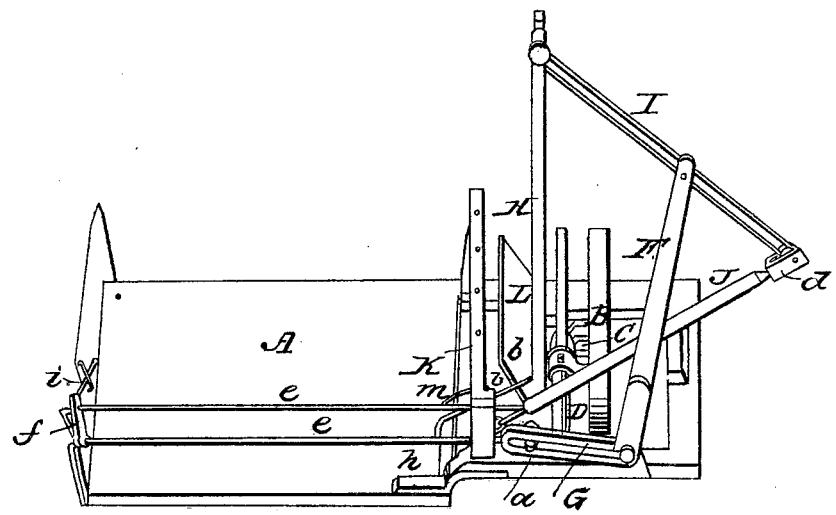
WITNESSES
INVENTOR

UNITED STATES PATENT OFFICE.

ABRAM ADAMS, OF BOSTON STATION, KENTUCKY.

IMPROVEMENT IN HARVESTER-RAKES.

Specification forming part of Letters Patent No. 91,401, dated June 15, 1869.

*To all whom it may concern:*

Be it known that I, ABRAM ADAMS, of Boston Station, in the county of Pendleton, and in the State of Kentucky, have invented certain new and useful Improvements in Harvester-Rakes; and do hereby declare that the following is a full, clear, and exact description thereof, reference being had to the accompanying drawings, and to the letters of reference marked thereon.

The nature of my invention consists in application of a self-acting rake to a reaper-platform in such a manner that as the reaper advances and cuts the hay or grain the rake will rake it off the platform and leave it in proper rows.

In order to enable others skilled in the art to which my invention appertains to make and use the same, I will now proceed to describe its construction and operation, referring to the annexed drawings, which form a part of this specification, and which represent a perspective of my invention.

A represents the reaper-platform, along the front edge of which the cutter is placed and operated in any of the known and usual ways. I have not deemed it necessary to show those parts in the drawings, as they may be made in any way desired.

B represents the driving-wheel, which is provided on its hub with a pinion, C. A crank-shaft, D, is supported in bearings on the frame which supports the reaper-platform A in such a manner that the crank $a$, attached to one end of said shaft, works in rear of the frame, and the other end of the shaft D is so placed that a movable pinion, $b$, placed on the same, may be thrown in and out of gear with the pinion C at pleasure by means of the lever E. In the rear part of the frame mentioned a beam, F, is pivoted, which beam is provided with a slotted arm, G. This arm is so placed that the crank $a$ projects through the slot in the same, and by the turning of the crank-shaft the beam F will obtain a reciprocating motion.

A standard, H, is placed at a suitable point on the frame of the machine, and to its upper end a slotted bar, I, is pivoted, this slotted bar being, at its lower end, pivoted in a small angular bar or box, $d$, in which also the end of the handle J to the rake is pivoted.

A pin, on the upper end of the beam F passes through the slot on the bar I, so that by the turning of the crank-shaft D the rake-handle J obtains a reciprocating motion along the rear edge of the reaper-platform A. The end of the handle J is attached to the head of the rake K, which slides on two rods, $e\ e$, the ends of which are connected by short bars $f\,f$, thus forming a rectangular frame, which is pivoted a suitable distance above the rear edge of the reaper-platform A.

I will now suppose that the machine is in motion and the rake K is at the outer end of the platform. Now, by the revolution of the crank-shaft D the rake is moved toward the inner end of said platform, carrying the grain with it. At the inner end of the platform is an aperture through which the grain falls down on the ground, an inclined board or sheet ot metal, L, protecting the machinery, so that the straw, &c., will not get into the same. As soon as the rake arrives at the inner end of the platform an inclined rod or railing, $h$, raises the outer end of the rake, the rods $e\ e$ being pivoted, as already described, which allows the rake to be thus raised. When raised as high as necessary, and at the moment when, by the motion of the beam F, it should be carried back again, a spring, $i$, will drop into a notch on the outer bar, $f$, holding the rake up while it moves backward to the outer edge of the platform. As soon as the rake arrives to its original place a pin, $m$, inserted in the rake, lifts the spring $i$ out of its notch, which allows the rake to drop down on the platform again, ready to rake the grain cut in the machine.

Instead of using the two rods $e\ e$ and bars $f\,f$, I may use one or three or more rods or bars, or, in fact, any device where the rake is made to slide or roll back and forth in the manner herein set forth.

Having thus fully described my invention, what I claim as new, and desire to secure by Letters Patent, is—

1. The arrangement and combination of the crank-shaft D, crank $a$, beam F, slotted arm G, standard H, slotted bar I, angular bar or box $d$, rake-handle J, and rake K, all substantially as and for the purposes herein set forth.

2. The arrangement of the rake K, rods $e\ e$, bars $f\ f$, and inclined railing $h$, all constructed and operating substantially as and for the purposes herein set forth.

3. The arrangement of the rods $e\ e$, bars $f\ f$, spring $i$, and pin $m$ on the rake K, all constructed and operating substantially as and for the purposes herein set forth.

In testimony that I claim the foregoing I have hereunto set my hand this 24th day of November, 1868.

ABRAM ADAMS.

Witnesses:
   JAMES M. ADAMS,
   JAMES M. CROZER.